Oct. 31, 1961 D. C. GERBER Re. 25,068

SUCTION CLEANER WITH CORD REEL

Original Filed Oct. 11, 1949 2 Sheets-Sheet 1

SUCTION CLEANER WITH CORD REEL

Original Filed Oct. 11, 1949 2 Sheets-Sheet 2

United States Patent Office

Re. 25,068
Reissued Oct. 31, 1961

25,068

SUCTION CLEANER WITH CORD REEL

Dale C. Gerber, North Canton, Ohio, assignor to The Hoover Company, North Canton, Ohio, a corporation of Ohio Original No. 2,661,074, dated Dec. 1, 1953, Ser. No. 120,733, Oct. 11, 1949. Application for reissue June 19, 1961, Ser. No. 121,806
6 Claims. (Cl. 183—37)

Matter enclosed in heavy brackets [ ] appears in the original patent but forms no part of this reissue specification; matter printed in italics indicates the additions made by reissue.

The present invention relates to portable electric appliances and more particularly to a novel automatic cord reel integrated with the other components of such appliances.

The cord reel constituting one of the principal features of this invention is characterized by the absence of the usual slip rings or their equivalent and, because of its unique design, permits the service cord to be directly connected to the motor at all times. Another feature of the invention is the fact that the motor rotates with the cord reel and preferably serves as the cord reel.

The invention also features a novel control for the cord reel which operates to lock the cord in any desired extended position and which is readily releasable merely by a simple manipulation of the cord at any point along an extended portion thereof.

Accordingly, it is an object of the invention to provide a novel portable electric appliance having a cord reel of unique design integrated with the usual components of the appliance.

Another object is the provision of a portable appliance having a cord reel of simplified design and in which the cord is connected directly to the motor rather than through slip rings or their equivalent.

Still another object of the invention is the use of the driving motor or some other element driven by it as the cord reel thereby avoiding the need for additional structure to serve this function.

A further object of the invention is to provide a suction cleaner design in which the motor-fan unit is rotatably supported within the casing and arranged, upon rotation, to store or play out the service cord as desired by the user.

Another object is the provision of means for driving the cord reel by a tension spring arranged to rotate the motor-fan unit.

Yet another object is the provision of novel control means for the cord reel and for locking the motor-fan unit with respect to the cleaner casing.

A further object is the provision of a novel motor-fan unit mounting in a cleaner casing.

Another object is the location of the cord reel as close as possible to the center of gravity of the appliance to avoid upsetting the same when operating the cord reel.

Figure 1:
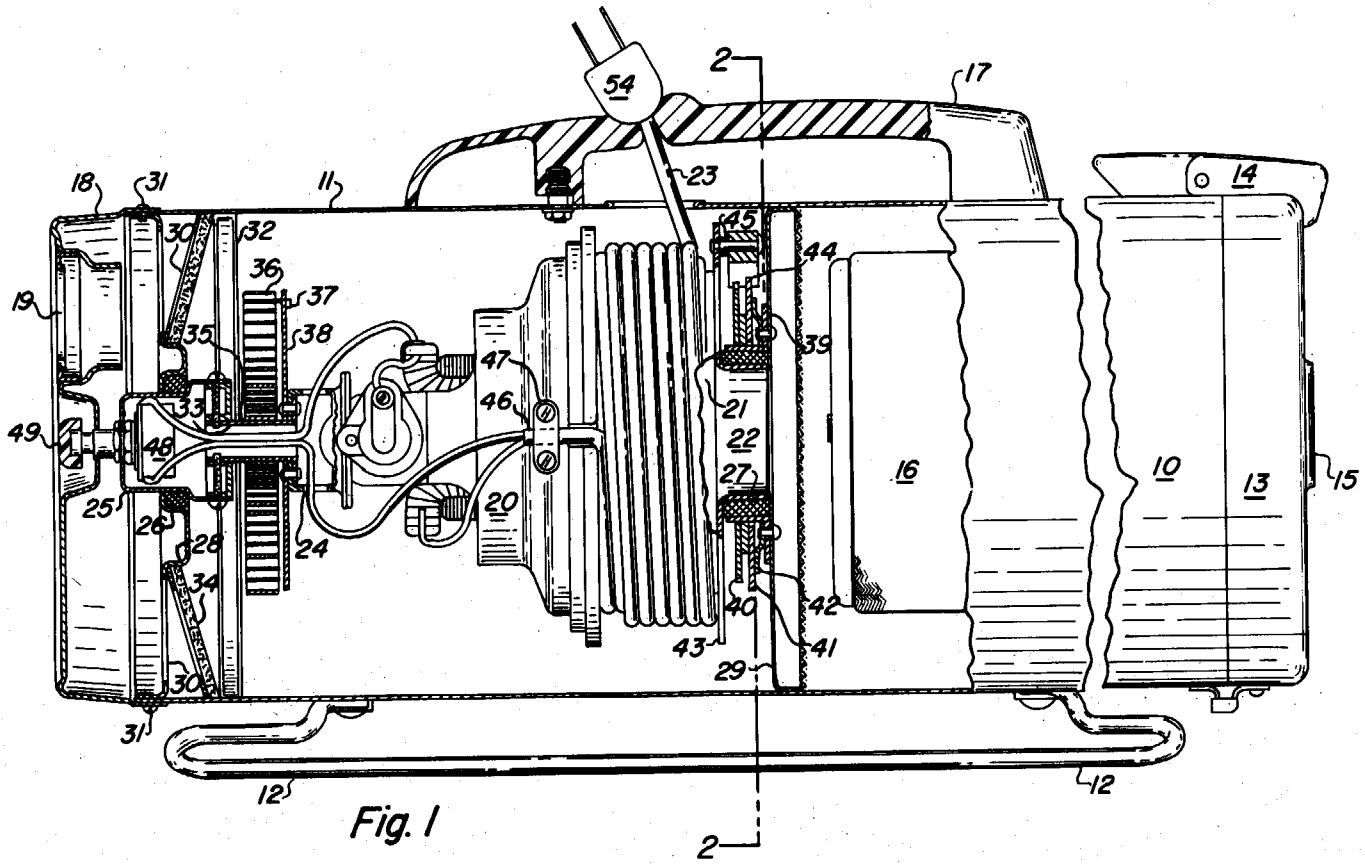
Figure 2:
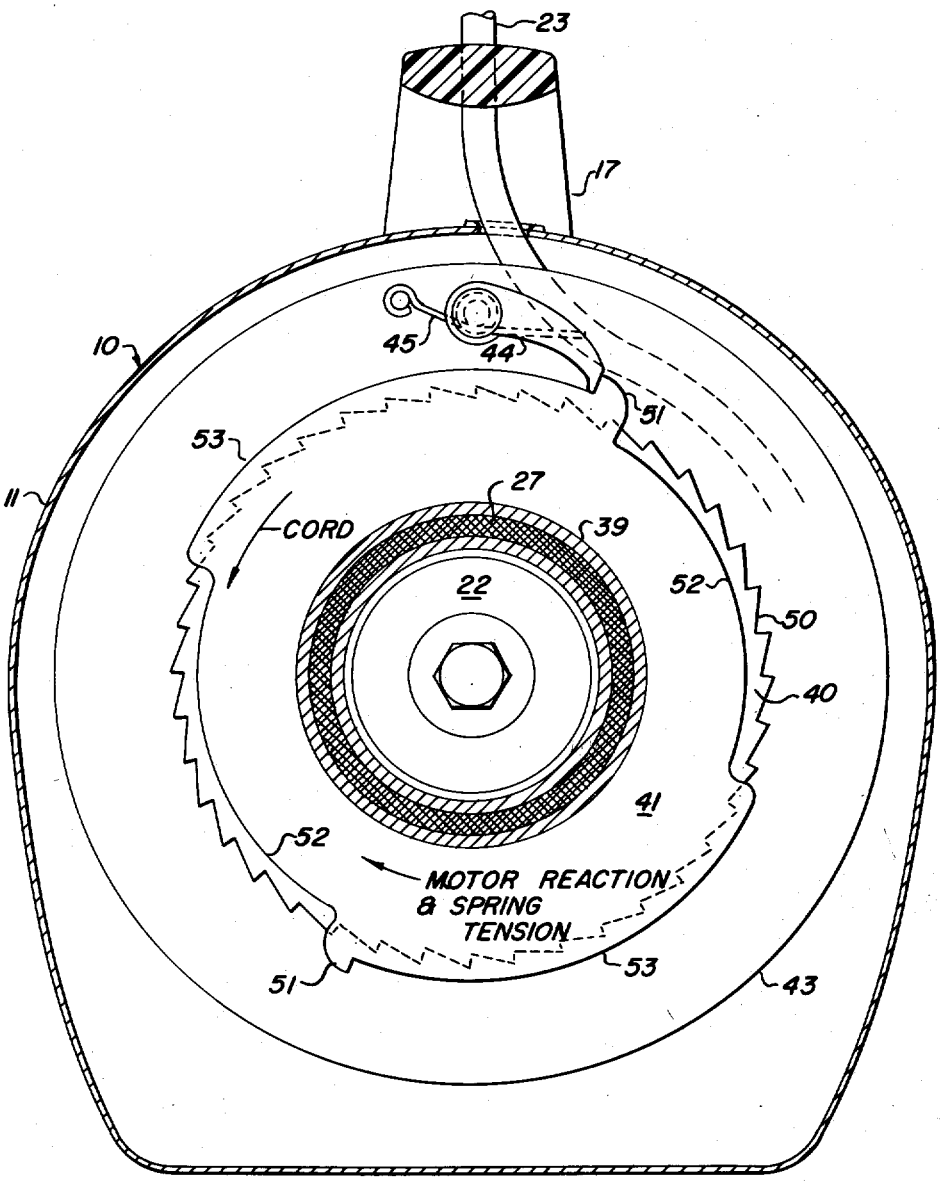

Various other objects and novel features of the invention will become apparent from a consideration of the following detailed description of a preferred embodiment thereof taken in connection with the attached drawings in which:

FIGURE 1 is a vertical sectional view through the power unit end of a suction cleaner incorporating the invention; and FIGURE 2 is a view on line 2—2 showing certain details of the cord reel control mechanism.

Referring to FIGURES 1 and 2, it will be noted that the invention has been shown as applied to a suction cleaner of the tank type. However, it is to be understood that a suction cleaner has been selected as a representative type of portable electric appliance in which the invention may be incorporated in order to enjoy the benefits and advantages thereof. The cleaner 10 comprises a generally cylindrical casing 11 supported by a pair of runners 12 secured to the under side thereof. An end cap 13 is removably secured to the filter end of the casing as by one or more of the usual toggle clamps 14. This cap has a combined air inlet and coupling receptacle 15 to which a flexible suction hose, not shown, may be attached in a well known manner. Cap 13 serves to seal the inlet end of a removable filter bag 16 to the casing in the customary manner. A convenient carrying handle 17 extends along the top side of casing 11. The other end of casing 11 is closed by a removable end cap 18 the upper portion of which is provided with a second hose coupling 19 which normally serves as the exhaust air outlet and to which the flexible hose may be coupled when it is desired to use the cleaner as a blower.

Reference will now be had to the power unit for the cleaner and the novel features of the invention. The power unit comprises an electric driving motor 20 to the forward end of which is coupled a multiple stage fan unit 21 of well known design having an axially extending air inlet 22. The circular outer casing of the fan has flanged ends and forms a cord storage reel for the cleaner service cord 23 as will become more clearly apparent hereinbelow. The motor 20 is of a well known design having a rotating armature and a surrounding field structure over which the air exhausted by fan 21 passes on its way to the exhaust air opening 19.

A generally tubular assembly 24 comprising several tubular stampings and fittings, as clearly shown in the drawings, forms an axial extension of the motor fan unit 20, 21. End cap 25 of this assembly together with the circular fan inlet housing 22 constitute journals for the opposite ends of the motor-fan assembly. These journals are respectively supported in bearings 26, 27 supported in bulkheads 28, 29. Bulkhead 28 is apertured at 30, 30 to permit the exhaust air to move therethrough and its outer perimeter is secured to the cleaner casing 11 as by screws 31. Bulkhead 29, on the other hand, is imperforate, except for an opening registering with inlet 22, and is secured to the casing by spot welding or otherwise.

Inwardly of bulkhead 28 and parallel thereto is a spider 32 having an opening at its center through which a small diameter thimble 33 of assembly 24 extends. Spider 32 cooperates with bulkhead 28 to support a frusto-conical final filter element 34. The innermost end 35 of a flat, steel, spirally arranged spring 36 is secured to spider 32 adjacent thimble 33. The outer end 37 of spring 36 is secured to a disk 38 rigidly attached to assembly 24. Thus, it will be clear that inner end 35 of the spring is held stationary while its outer end is attached to the rotatably supported motor-fan unit. Spring 36 is arranged to urge the motor-fan unit to rotate [counter-]clockwise as viewed in FIGURE 2. As a consequence, spring 36 always tends to reel the service cord 23 inwardly upon the storage drum provided on the exterior of suction fan 21. It will be obvious that the motor casing may be utilized as the cord reel in lieu of the fan casing, if desired, and more particularly in applications to portable appliances having only a motor.

The control mechanism for locking the motor-fan unit against rotation during operation of the cleaner and at all times except during reeling or unreeling of the service cord is shown as mounted about forward bearing 27 of the motor-fan unit. This control is entirely housed within the cleaner casing in the space between bulkhead 29 and the adjacent end of fan 21. The control comprises essentially a clutch which may be selectively clutched and de-clutched by means of a pivoted pawl.

Structurally, the control comprises a collar 39 which surrounds bearing 27 and is rigidly secured to bulkhead 29. A toothed disk 40 is welded or otherwise secured to collar 39. A second disk 41 having a specially contoured periphery is journaled loosely upon collar 39 and is normally held in firm frictional engagement with the adjacent face or disk 40 by means of a light disk spring 42 rigidly secured to collar 39. One rim 43 of the combined fan casing and service cord reel carries a pivoted pawl 44 biased toward the edges of disks 40 and 41 by means of a torsion spring 45.

The innermost end 46 of service cord 23 is secured to motor 20 at 47. The lead wires of the service cord are connected directly to the motor through a push-push type switch 48 mounted on end cap 25 of assembly 24. The control button 49 of switch 48 projects outwardly through an opening in end cap 18. Switch 48 is of the type which is opened upon depressing button 49 and closed upon the next succeeding depression thereof. Control button 49 for the switch is in axial alignment with the motor-fan unit and rotates therewith when the cord is being reeled or unreeled.

Reference will now be had to FIGURE 2 for a clearer understanding of the construction of disks 40 and 41. From this figure it will be noted that the periphery of disk 40 is provided with evenly distributed teeth 50 of uniform shape. Disk 41, however, has two notches 51, 51 located 180° apart and radially disposed slightly beyond the tips of teeth 50 on disk 40, as clearly appears from FIGURE 2. The remaining portion of disk 41 is separated into two pairs or segments one pair 52 of which has a radial extent somewhat less than that of teeth 50 while the other pair of segments 53 has a radial extent somewhat greater than the radius of teeth 50. The several segments are interconnected by cam surfaces shaped to facilitate the passage of the pivoted pawl or detent 44 thereover.

OPERATION

Let it be assumed that the cleaner has been in storage and that the cord is reeled to the position shown in FIGURE 1. To use the cleaner, the operator grasps the plug 54 on the end of the service cord and pulls outwardly on it. As the cord is pulled outwardly the motor-fan unit and the integral cord reel rotate *counter*-clockwise as viewed in FIGURE 2. At the same time the partially relaxed spiral spring 36 is placed under increasing tension as its outermost end is wound about fixed inner end 35. As pawl 44 rides over teeth 50, it will produce a clearly audible clicking sound advising the operator that the pull on the cord can be released and that the pawl will immediately engage a tooth 50 and lock the motor-fan unit against rewinding under the influence of spring 36. Plug 54 can now be connected to an outlet and button 49 depressed to energize the motor. Since the motor reaction forces act in the same direction as spring 36, pawl 44 holds the motor field and the cord reel firmly locked in a stationary position.

If the operator desires to extend additional cord, he simply pulls on the cord until the proper length is obtained and releases it while the clicking sound of pawl 44 on teeth 50 is audible.

If, on the other hand, the operator wishes to store the cord, he pulls on the cord until the clicking sound ceases, which occurs whenever the pawl is riding along the surface of one of the sectors 53, and then releases it. The increased tension on spring 36 will immediately rotate the motor and reel [counter-]clockwise whereupon pawl 44 will engage notch 51 and cause disk 41 to rotate with the pawl and reel until the cord is completely stored within the cleaner casing.

It will be apparent that during re-winding of the cord, there is slippage between rotating disk 41 and stationary disk 40. Therefore, during re-winding, pawl 44 may be said to operate to declutch these two disks which are normally held clutched together in a stationary position by light spring 42.

When the motor is energized the fan draws air inwardly through the usual hose connected to opening 15, through the walls of filter 16 and into fan inlet 22. Air exhausted from the rear of the fan passes over the motor to cool it, through an opening not shown, after which it passes through final filter 34 and through opening 30 to exhaust outlet 19. The dusting tool hose may be connected to either inlet 15 or outlet 19 depending upon whether it is desired to use the cleaner for suction or blowing purposes.

While it is thought self-evident from the foregoing description and illustration of the preferred embodiment of my invention, it is desired to point out that the cord reel is located very close to the center of gravity of the cleaning appliance taken as a whole. It is also to be observed that the cord is unreeled by pulling thereon from a point directly opposite the center of gravity. As a consequence, the operative forces accompanying reeling or unreeling of the cord are not applied in a direction tending to upset the cleaner. On the contrary, substantially the full weight of the cleaner is effective to prevent overturning or upsetting of the cleaner.

Having thus described my invention what I claim is:

1. The combination with a suction cleaner of the type having a casing, a unitary motor-fan unit therein; of means rotatably supporting said motor-fan unit, a service cord having its inner end directly connected to said motor, said unit including means surrounding a part thereof for reeling and storing said service cord thereon, means for rotating said unit to reel said service cord into storage position, and control means automatically operable to lock said unit against rotation to reel said cord in any one of a plurality of extended positions of said cord.

2. A portable electrical appliance having a driving motor, means for rotatably supporting said motor, means rotatable with said motor and providing a storage reel for the service cord to said appliance, spring means for rotating said storage reel and motor in a direction to store said cord, and automatically operable control means for normally locking said reel against re-winding an extended portion of said cord due to the re-action forces of said motor when the same is energized.

3. In combination with a portable, electric appliance having a service cord, means for rotatably supporting an integral electric motor and cord reel assembly within said appliance, spring means urging said assembly to rotate in a direction to wind and store a service cord on said reel, an electric service cord for said appliance, means connecting the inner end of said service cord directly to said motor, and control means for selectively locking said rotatable assembly in different positions depending upon the length of extended service cord desired and for holding the service cord in a selected extended position against the reaction forces of said motor.

4. A portable electric appliance as defined in claim 3 including an electric switch for said appliance, said switch being mounted upon one end of said rotatable assembly and having a manually operable control member extending to a point exteriorly of said appliance.

5. A portable electric appliance having a driving motor, means for rotatably supporting said motor, means rotatable directly with said motor and providing a storage reel for the service cord of said appliance, spring means for rotating said storage reel and motor in a direction to store said cord, an automatically operable control means supported in part by said motor for normally locking said reel against re-winding an extended portion of said cord due to the reaction forces of said motor when the same is energized, said control means including a control disk having a plurality of spaced locking detents, a pawl selectively engageable in said detents to lock said reel against re-winding, lockout means normally rotatable with said control disk for holding said pawl out of engagement with said control disk during a portion of each unwinding revolution of said reel, said lockout means including means for holding said pawl disengaged from said control disk whenever the unreeling of said cord is discontinued while said pawl is in engagement with said lockout means whereby said spring is operable to rotate the storage reel to re-wind the service cord.

6. In combination, a suction cleaner of the tank type having an elongated casing, filtering means within one end of said casing, an integral motor-fan unit within the other end of said casing, said unit comprising an electric motor and a suction fan casing in axial alignment with one another, said motor-fan unit having a pair of radial flanges projecting outwardly therefrom forming a service cord reel intermediate the ends of said unit, bearing means rotatably supporting said motor-fan unit, a service cord on said reel having its inner end connected directly to said motor and an outer end projecting through a cord dispensing opening in said casing, spring means connected between said cleaner casing and said motor-fan unit urging the latter to rotate in a direction to store said cord on said reel, said unit being operative to dispense cord from said reel when a pulling force is applied to the outer end of said cord, and control means operative to lock said unit against reverse rotation by said spring means and by the reaction forces of said motor when energized.

References Cited in the file of this patent or the original patent

UNITED STATES PATENTS

| | | |
|---|---|---|
| 1,124,211 | Coseo | Jan. 5, 1915 |
| 2,246,862 | Smellie | June 24, 1941 |
| 2,314,177 | Tamarin | Mar. 16, 1943 |
| 2,391,840 | Meletti | Dec. 25, 1945 |
| 2,440,719 | Karp et al. | May 4, 1948 |
| 2,443,763 | Dahlgren et al. | June 22, 1948 |
| 2,487,395 | Strang | Nov. 8, 1949 |

FOREIGN PATENTS

| | | |
|---|---|---|
| 616,857 | Germany | Aug. 7, 1935 |